United States Patent
Fujieda

(10) Patent No.: US 10,320,967 B2
(45) Date of Patent: Jun. 11, 2019

(54) SIGNAL PROCESSING DEVICE, NON-TRANSITORY COMPUTER-READABLE STORAGE MEDIUM, SIGNAL PROCESSING METHOD, AND TELEPHONE APPARATUS

(71) Applicant: Oki Electric Industry Co., Ltd., Tokyo (JP)

(72) Inventor: Masaru Fujieda, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 155 days.

(21) Appl. No.: 15/617,004

(22) Filed: Jun. 8, 2017

(65) Prior Publication Data

US 2018/0077278 A1   Mar. 15, 2018

(30) Foreign Application Priority Data

Sep. 15, 2016   (JP) .................................. 2016-180719

(51) Int. Cl.
*H04M 1/00* (2006.01)
*H04M 3/00* (2006.01)
*H04M 9/08* (2006.01)

(52) U.S. Cl.
CPC ............. *H04M 3/002* (2013.01); *H04M 9/08* (2013.01); *H04M 2201/26* (2013.01)

(58) Field of Classification Search
CPC ..... H04M 3/002; H04M 9/08; H04M 2201/26
USPC ........... 379/387.01–390.04; 381/12, 56, 106, 381/107, 119
See application file for complete search history.

(56) References Cited

U.S. PATENT DOCUMENTS

| | | | | |
|---|---|---|---|---|
| 3,732,371 A | * | 5/1973 | Burwen | H03G 7/002 |
| | | | | 381/106 |
| 9,025,793 B2 | * | 5/2015 | Sakai | H03G 3/3005 |
| | | | | 381/107 |
| 2007/0121966 A1 | * | 5/2007 | Plastina | H03G 7/007 |
| | | | | 381/104 |
| 2008/0165988 A1 | * | 7/2008 | Terlizzi | H04M 1/6016 |
| | | | | 381/119 |
| 2012/0253813 A1 | | 10/2012 | Katagiri | |
| 2015/0263690 A1 | * | 9/2015 | Goto | H03G 7/002 |
| | | | | 381/56 |
| 2017/0345409 A1 | * | 11/2017 | Fujisawa | G10K 15/12 |

FOREIGN PATENT DOCUMENTS

| | | |
|---|---|---|
| JP | 2000-151313 A | 5/2000 |
| JP | 2009-021859 A | 1/2009 |
| JP | 2012-215600 A | 11/2012 |
| JP | 2016-025425 A | 2/2016 |

* cited by examiner

*Primary Examiner* — Md S Elahee
(74) *Attorney, Agent, or Firm* — Rabin & Berdo, P.C.

(57) ABSTRACT

The signal processing device comprises the adaptive gain calculation unit configured to calculate and output the adaptive gain for processing the voice reception output signal, by utilizing at least the voice transmission input signal and the relative volume value indicating the predetermined relative sound volume ratio between the voice transmission input signal and the voice reception output signal; and the multiplication unit configured to calculate the voice reception output signal by multiplying the signal based on the voice reception input signal by the value based on the adaptive gain.

12 Claims, 13 Drawing Sheets

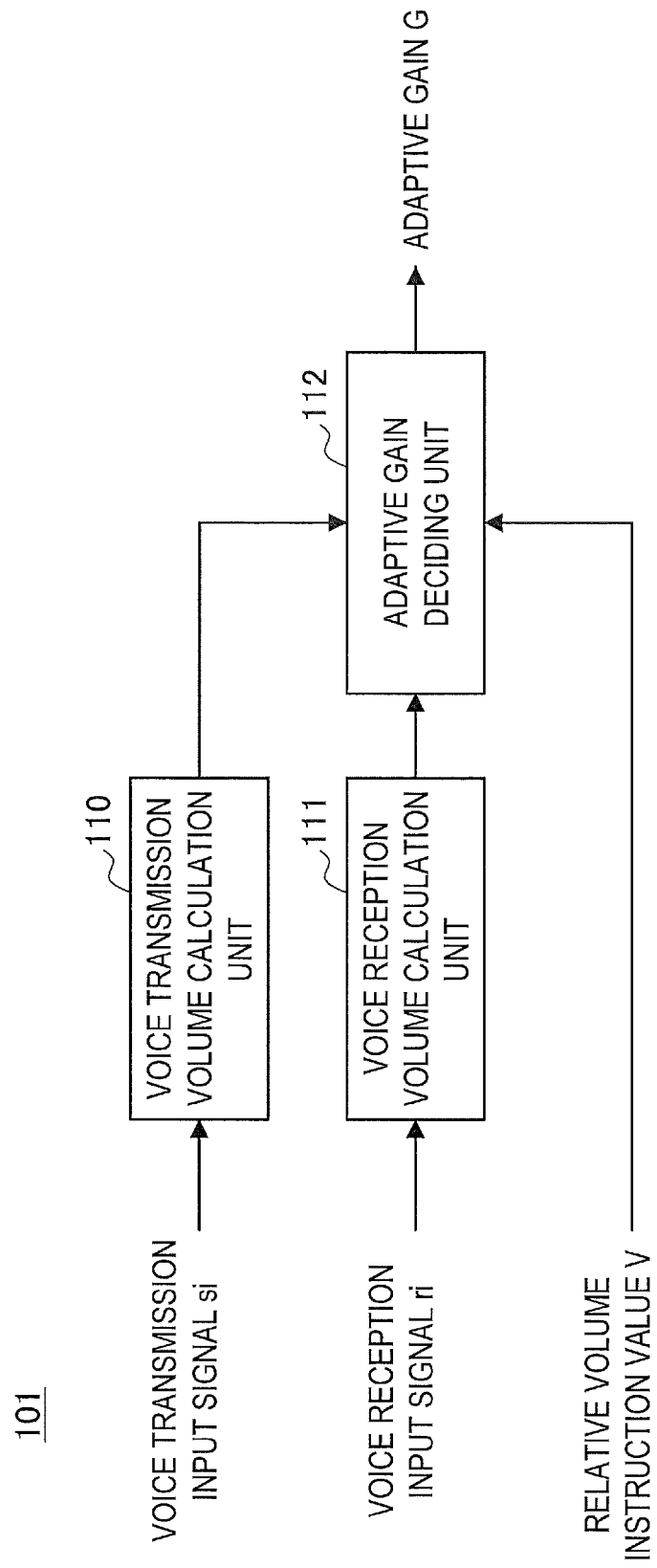

FIG.5

| $\dfrac{sv \cdot V}{rv}$ | LESS THAN 0.3 | 0.3 OR MORE LESS THAN 0.7 | 0.7 OR MORE LESS THAN 1.4 | 1.4 OR MORE LESS THAN 3.3 | 3.3 OR MORE |
|---|---|---|---|---|---|
| G | 0.5 | 0.7 | 1.0 | 1.4 | 2.0 |

FIG.8

| sv·V | LESS THAN 0.3 | 0.3 OR MORE LESS THAN 0.7 | 0.7 OR MORE LESS THAN 1.4 | 1.4 OR MORE LESS THAN 3.3 | 3.3 OR MORE |
|---|---|---|---|---|---|
| G | 0.5 | 0.7 | 1.0 | 1.4 | 2.0 |

SIGNAL PROCESSING DEVICE, NON-TRANSITORY COMPUTER-READABLE STORAGE MEDIUM, SIGNAL PROCESSING METHOD, AND TELEPHONE APPARATUS

CROSS REFERENCE TO RELATED APPLICATION(S)

This application is based upon and claims benefit of priority from Japanese Patent Application No. 2016-180719, filed on Sep. 15, 2016, the entire contents of which are incorporated herein by reference.

BACKGROUND

The present invention relates to a signal processing device, a non-transitory computer-readable storage medium, a signal processing method, and a telephone apparatus.

A technology for allowing persons present at remote places, and persons present at spatially isolated places, such as a wall, a room, and the like, to audially communicate with each other has been developed for long periods of time. A fixed-line phone, as well as a mobile phone, a smartphone and the like, has been provided for the purpose of telecommunication of voice only. Also, a video phone, a video meeting, a telework terminal, and the like have been provided as telecommunication that uses photographs, images (portrait or avatar), and video in addition to voice (smartphone can provide these types of telecommunication).

In the following, these are collectively referred to as a bidirectional telephone apparatus (or simply "telephone apparatus"). Also, bidirectional telephone apparatuses communicate with each other to provide a function for allowing users of those bidirectional telephone apparatuses to make a telephone call to each other, and when an attention is paid to one bidirectional telephone apparatus among them, the user of the bidirectional telephone apparatus can be defined as a principal person (one person or one group), and the user of the other bidirectional telephone apparatus can be defined as a partner (not limited to one person or one group). In the following, the principal person's side is referred to as a near end, and the partner's side is referred to as a far end. Further, an audio signal transmitted from the far end side and received at the near end side is referred to as a voice reception signal, and an audio signal transmitted from the near end side to the far end side is referred to as a voice transmission signal.

In the bidirectional telephone apparatus, a sound release device (for example, a speaker) is physically close to a sound collection device (for example, a microphone) in most cases, and thus a phenomenon (acoustic echo) in which a voice reception signal generated from the sound release device is input into the sound collection device as an echo occurs. In particular, when an echo is input in the bidirectional telephone apparatus of the far end side, the near end speaker hears the delayed voice of himself or herself from the sound release device, and thus has a harmful effect that bothers the near end speaker who is speaking. Also, when a large echo occurs in the bidirectional telephone apparatuses of both sides, a howling is generated.

In a conventional bidirectional telephone apparatus (the telephone apparatus), a sound release volume control instruction from the user is accepted by using a volume instruction device (for example, a volume control device for accepting change of a voice reception volume), and in accordance with the received control instruction, the signal processing device performs signal processing for adjusting the power of the voice reception signal or the like. As described above, in the conventional bidirectional telephone apparatus, it is necessary to manually control and reduce the sound volume of the voice reception signal by using the volume instruction device to prevent an echo from occurring, but the manual control requires advanced know-how (familiarization with operation), and when the sound volume of the voice reception signal is reduced too small, a harmful effect that makes the user unable to catch what the partner says occurs.

In order to solve this problem, an echo suppressor and an echo canceller that suppresses and removes the voice reception signal input into the sound collection device of the near end side are proposed (for example, JP 2009-21859A). Conventionally, with the above technology, an echo of the voice reception signal is not transmitted to the far end side, regardless of the sound volume of the voice reception signal. Thus, if the technology is employed in the bidirectional telephone apparatuses of the both sides, the user can freely set the sound release volume.

SUMMARY

However, in the conventional bidirectional telephone apparatus (the telephone apparatus), the magnitude of the sound release volume sometimes causes harmful effects other than echo and howling as described below, and the user is not necessarily able to prevent those harmful effects easily.

In the conventional telephone apparatus, when the voice volume of the far end speaker is small, or when microphone sensitivity in the bidirectional telephone apparatus of the far end side is set to be low, the voice reception signal becomes too small, and the near end speaker is sometimes unable to catch speech content of the far end speaker.

Also, in the conventional telephone apparatus, when the voice volume of the far end speaker is large, or when the microphone sensitivity in the bidirectional telephone apparatus of the far end side is set to be high, the voice reception signal becomes too large, and confidentiality of conversation is impaired, and an unrelated person around the near end side is sometimes caused to feel discomfort.

Under the above described situation, the user who utilizes the conventional telephone apparatus can operate the volume instruction device provided in the telephone apparatus to change the setting to increase/decrease the sound release volume. However, because of a functional limit of the signal processing device that processes the voice reception signal or the like in accordance with the instruction that the volume instruction device has received, the voice reception signal does not become large/small sufficiently in some cases, even if the sound volume is set at the maximum/minimum (functional limit).

Also, when the user do not know the magnitude of appropriate sound volume setting due to lack of use experience of the user, the user has to repeat trial and error to set the sound release volume (lack of know-how).

Further, when the user does not remember the operation method of the volume instruction device or are unable to operate the volume instruction device due to some sort of circumstances (for example, conducting another work while making a telephone call), the user is unable to change the setting of the sound release volume (operation difficult state).

Thus, a signal processing device, a program, a method, and a telephone apparatus that can process a telephone signal to enable a preferable bidirectional telephone call in accordance with a situation of a near end side are desired.

According to an embodiment of the present invention, a signal processing device is configured to supply a voice reception output signal to a sound release device side, the voice reception output signal is based on a voice reception input signal received from far end by telephone apparatus having a sound release device and a sound collection device, and the signal processing device is configured to transmit a voice transmission output signal to the far end side, the voice transmission output signal is based on a voice transmission input signal supplied from the sound collection device side. The signal processing device comprises: an adaptive gain calculation unit configured to calculate and output an adaptive gain for processing the voice reception output signal, by utilizing at least the voice transmission input signal and a relative volume value, the relative volume value indicates a predetermined relative sound volume ratio between the voice transmission input signal and the voice reception output signal; and a multiplication unit configured to calculate the voice reception output signal by multiplying a signal based on the voice reception input signal by a value based on the adaptive gain.

According to an embodiment of the present invention, a non-transitory computer-readable storage medium storing a signal processing program is provided. The signal processing program causes a computer provided in a signal processing device. The signal processing device is configured to supply a voice reception output signal to a sound release device side, the voice reception output signal is based on a voice reception input signal received from far end by telephone apparatus having a sound release device and a sound collection device. And, the signal processing device is configured to transmit a voice transmission output signal to the far end side, the voice transmission output signal is based on a voice transmission input signal supplied from the sound collection device side. The signal processing program causes the computer to function as: an adaptive gain calculation unit configured to calculate and output an adaptive gain for processing the voice reception output signal, by utilizing at least the voice transmission input signal and a relative volume value indicating a predetermined relative sound volume ratio between the voice transmission input signal and the voice reception output signal; and a multiplication unit configured to calculate the voice reception output signal by multiplying a signal based on the voice reception input signal by a value based on the adaptive gain.

According to an embodiment of the present invention, a signal processing method is performed by a signal processing device. The signal processing device is configured to supply a voice reception output signal to a sound release device side, the voice reception output signal is based on a voice reception input signal received from far end by telephone apparatus having a sound release device and a sound collection device. And, the signal processing device is configured to transmit a voice transmission output signal to the far end side, the voice transmission output signal is based on a voice transmission input signal supplied from the sound collection device side. And, the signal processing device includes an adaptive gain calculation unit and a multiplication unit. The signal processing method involves calculating and outputting, by the adaptive gain calculation unit, an adaptive gain for processing the voice reception output signal, by utilizing at least the voice transmission input signal and a relative volume value indicating a predetermined relative sound volume ratio between the voice transmission input signal and the voice reception output signal;

and calculating, by the multiplication unit, the voice reception output signal by multiplying a signal based on the voice reception input signal by a value based on the adaptive gain.

According to an embodiment of the present invention, a telephone apparatus includes: a sound release device; a sound collection device; and a signal processing device. The signal processing device is configured to supply a voice reception output signal to the sound release device side, the voice reception output signal is based on a voice reception input signal received from far end. And, the signal processing device is configured to transmit a voice transmission output signal to the far end side, the voice transmission output signal being is on a voice transmission input signal supplied from the sound collection device side. The signal processing device is the above described signal processing device.

According to the embodiments of the present invention, a telephone signal can be processed to enable preferable bidirectional telephone call in accordance with the situation of the near end side.

BRIEF DESCRIPTION OF THE DRAWINGS

FIG. 3 is a block diagram illustrating a functional configuration of inside of an adaptive gain acquisition unit according to the first embodiment;

FIG. 5 is an explanatory diagram illustrating an example of a table when an adaptive gain deciding unit according to the first embodiment decides an adaptive gain;

FIG. 8 is an explanatory diagram illustrating an example of a table when an adaptive gain deciding unit according to the second embodiment decides an adaptive gain;

DETAILED DESCRIPTION OF THE EMBODIMENT(S)

Figure 1:
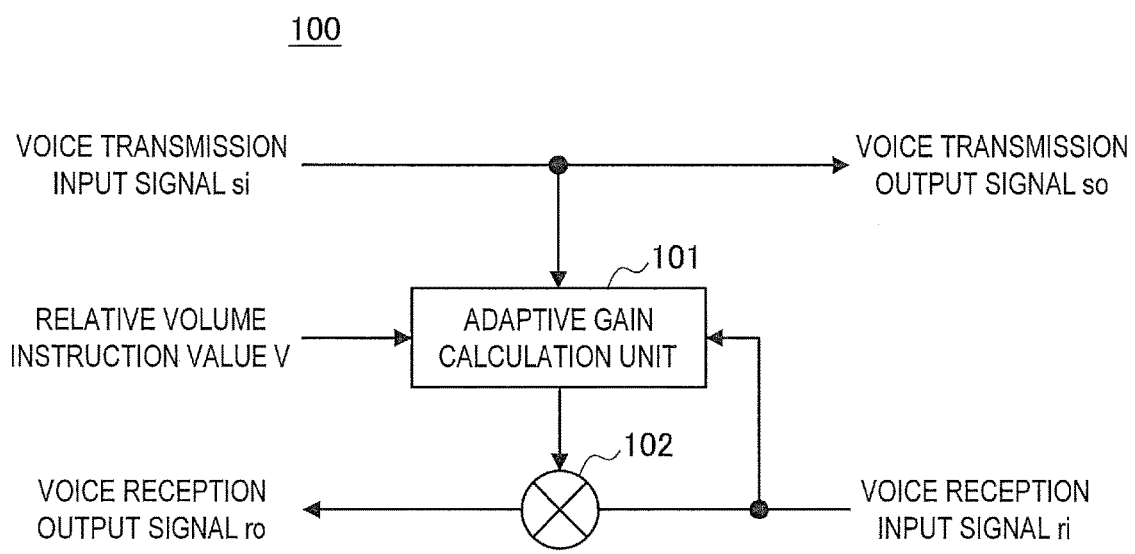
FIG. 1 is a block diagram illustrating a functional configuration of a signal processing device according to a first embodiment.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(A) First Embodiment

In the following, a signal processing device, a program, a method, and a telephone apparatus according to a first embodiment of the present invention will be described in detail with reference to drawings.

(A-1) Configuration of First Embodiment

Figure 2:
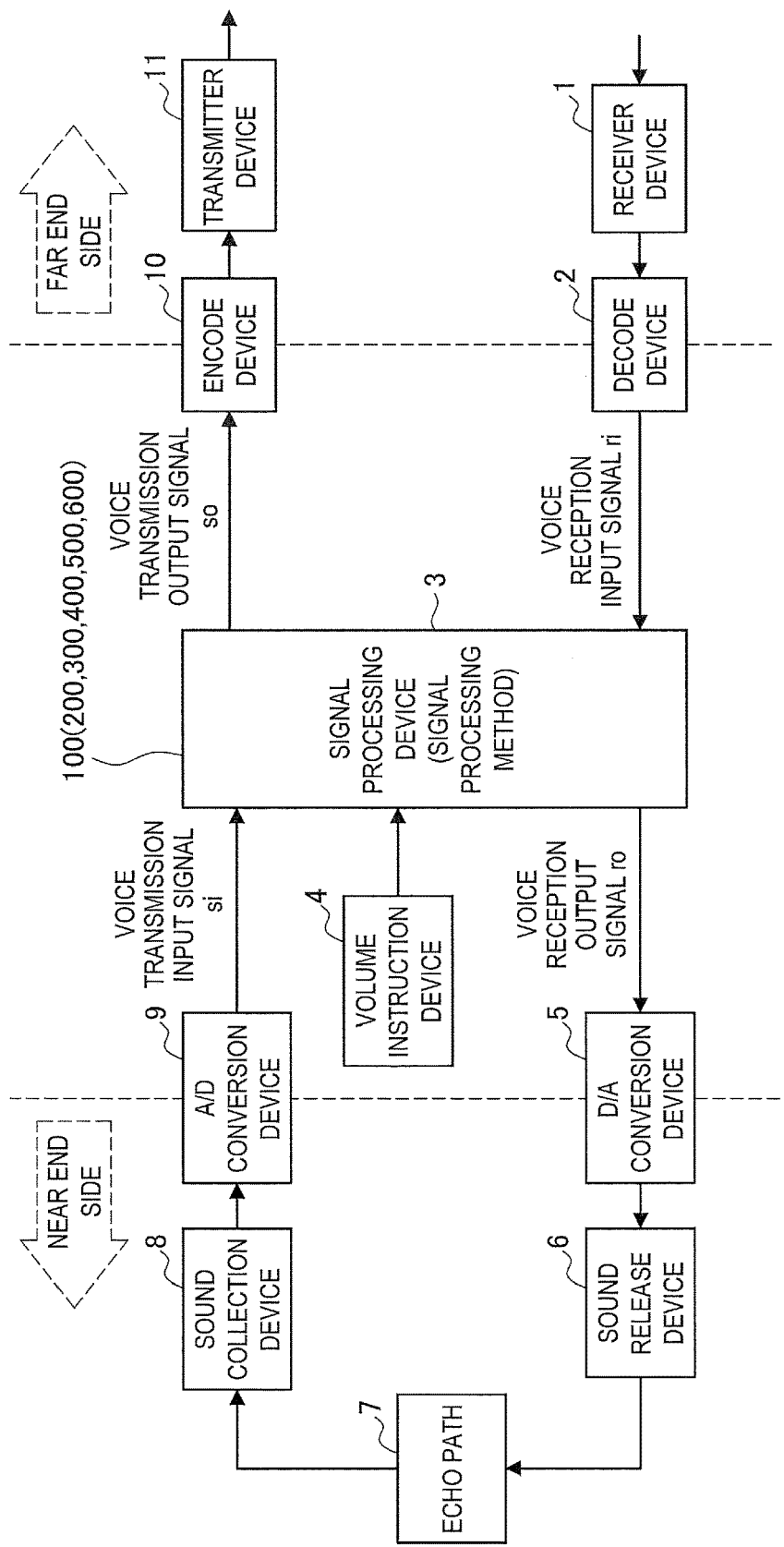
FIG. 2 is a block diagram illustrating an overall configuration of a telephone apparatus according to the first embodiment.

FIG. 2 is a block diagram illustrating an overall configuration of a telephone apparatus 1000 (a bidirectional telephone apparatus) according to this embodiment. Note that reference signs in parentheses in FIG. 2 are reference signs that are used in second to sixth embodiments described later.

The telephone apparatus 1000 includes a receiver device 1, a decode device 2, a signal processing device 3, a volume instruction device 4, a D/A conversion device 5, a sound release device 6, a sound collection device 8, an A/D conversion device 9, an encode device 10, and a transmitter device 11.

The receiver device 1 receives voice reception data that is transmitted in a wired or wireless manner.

The decode device 2 acquires a digital signal (for example, a digital audio signal of PCM format) by decoding the received data that is received from the far end side, and supplies the digital signal to the signal processing device 3 as a voice reception input signal.

The signal processing device 3 supplies the voice reception input signal itself or a processed voice reception input signal as a voice reception output signal to the D/A conversion device 5. Also, the signal processing device 3 supplies a voice transmission input signal itself or a processed voice transmission input signal as a voice transmission output signal to the encode device 10.

The D/A conversion device 5 converts the voice reception input signal (the processed voice reception input signal) supplied from the signal processing device 3 into an analog signal, and supplies the voice reception input signal to the sound release device 6.

The sound release device 6 (a speaker) releases the sound based on the voice reception input signal of analog format supplied from the D/A conversion device 5 to a space.

The sound collection device 8 (a microphone) collects the voice of the user using the bidirectional telephone apparatus and background noise, and supplies the obtained voice transmission signal (analog signal) to the A/D conversion device 9. Note that the voice reception signal released from the sound release device 6 is collected into the voice transmission signal via an echo path 7 in some cases.

The A/D conversion device 9 converts the voice transmission signal to a digital signal, and supplies the digital signal to the signal processing device 3 as the voice transmission input signal.

The encode device 10 supplies the voice transmission data obtained by encoding the voice transmission output signal to the transmitter device 11, and the transmitter device 11 transmits the voice transmission data to the far end side in a wired or wireless manner.

The volume instruction device 4 is a device for accepting a control instruction of a sound release volume from the user. In the conventional telephone apparatus, a value that the user has designated by the volume instruction device is a value corresponding to a gain that is multiplied by the voice reception input signal (in other words, a sound volume instruction value or an absolute sound volume instruction value). In contrast, the volume instruction device 4 according to this embodiment accepts an input of a value corresponding to a relative volume ratio between the voice transmission input signal and the voice reception output signal. Hence, in the following, the value that is designated by the user and is supplied from the volume instruction device 4 to the signal processing device 3 is referred to as "relative volume instruction value" or "relative volume value". A specific device through which the volume instruction device 4 accepts the instruction from the user is not limited, but for example a volume control device that includes a hardware button or a knob (for example, a variable resistor) may be used, or an object (for example, a software button, etc.) in an operation screen (a GUI screen) on a computer may be used.

Next, an inner configuration of the signal processing device 100 will be described.

FIG. 1 is an explanatory diagram illustrating the inner configuration of the signal processing device 100.

As illustrated in FIG. 1, the signal processing device 100 according to the first embodiment includes an adaptive gain calculation unit 101 and a multiplication unit 102.

The adaptive gain calculation unit 101 calculates an adaptive gain G on the basis of a voice transmission input signal si, a voice reception input signal ri, and a relative volume instruction value V.

The multiplication unit 102 obtains a voice reception output signal ro by multiplying the voice reception input signal ri by the adaptive gain G.

FIG. 3 is a block diagram illustrating a functional configuration of inside of the adaptive gain calculation unit 101.

As illustrated in FIG. 3, the adaptive gain calculation unit 101 includes a voice transmission volume calculation unit 110, a voice reception volume calculation unit 111, and an adaptive gain deciding unit 112.

The voice transmission volume calculation unit 110 calculates a sound volume (i.e., a voice transmission volume sv) of the voice transmission input signal si.

The voice reception volume calculation unit 111 calculates a sound volume (i.e., a voice reception volume rv) of the voice reception input signal ri.

The adaptive gain deciding unit 112 decides the adaptive gain G on the basis of the voice transmission volume sv, the voice reception volume rv, and the relative volume instruction value V.

(A-2) Operation of First Embodiment

Next, operation (a signal processing method according to the embodiment) of the signal processing device 100 constituting the telephone apparatus 1000 according to the second embodiment which has the above configuration will be described.

The adaptive gain calculation unit 101 calculates the adaptive gain G on the basis of the voice transmission input signal si, the voice reception input signal ri, and the relative volume instruction value V, and supplies the obtained adaptive gain G to the multiplication unit 102. G is decided such that G weakly increases with regard to the sound volume of si and V, and weakly decreases with regard to the sound volume of ri. Detailed operation of the adaptive gain calculation unit 101 will be described later. "Weakly increasing" includes "monotonically increasing in broad sense" and "monotonically non-decreasing". And, "Weakly decreasing" includes "monotonically decreasing in broad sense" and "monotonically non-increasing".

The multiplication unit 102 multiplies the voice reception input signal ri by the adaptive gain G, and outputs the obtained voice reception output signal ro.

Next, detailed operation of the adaptive gain calculation unit 101 will be described with reference to FIG. 3.

The voice transmission volume calculation unit 110 calculates the sound volume of the voice transmission input signal si, and supplies the obtained voice transmission volume sv to the adaptive gain deciding unit 112. Here, the sound volume unit the magnitude or the power of the signal. As the calculation method of the sound volume, a method that sets the sound volume to the maximum value or the average value, within a certain section, of the absolute values (magnitude) or the square values (the power) of the signal or a method that estimates the average value by a time constant filter (also referred to as leaky integration) is well used for example, but the calculation method of the sound volume is not limited thereto. In the following, the value obtained by estimating the average value of the absolute values (magnitude) of the signal by the time constant filter is referred to as a sound volume. Specifically, calculation is conducted on the basis of equation (1), where a current voice transmission input signal is si; one-sample previous voice transmission volume is sv; and the time constant is τ (0<τ<1).

$$sv = (\tau-1) \cdot |si| + \tau \cdot sv' \quad (1)$$

Figure 4A:
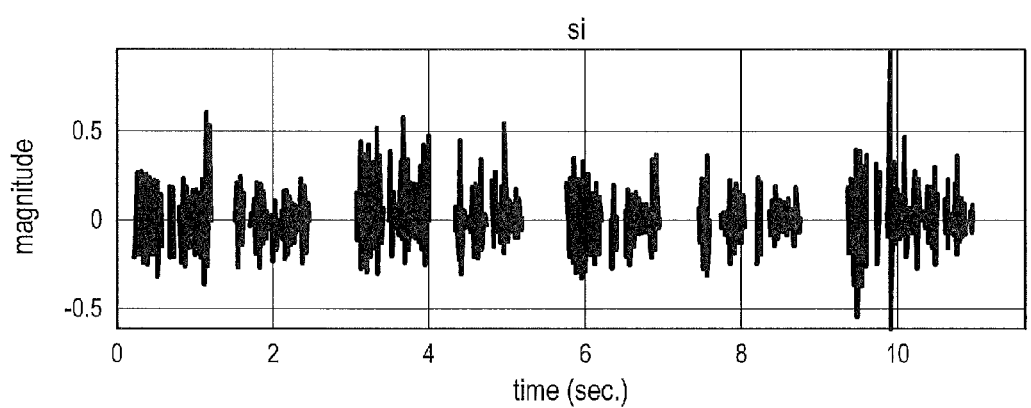
FIG. 4A is a first graph illustrating an example of a result of calculation of a voice transmission volume on the basis of an input voice transmission signal by a voice transmission volume calculation unit according to the first embodiment.
Figure 4B:
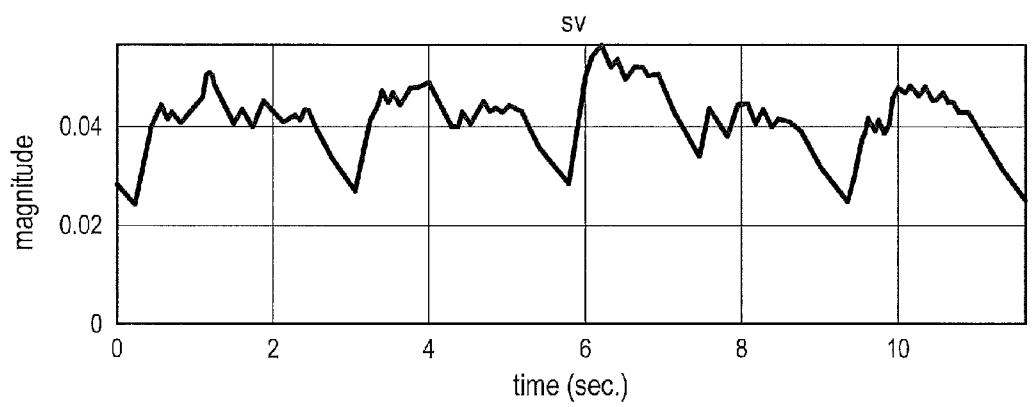
FIG. 4B is a second graph illustrating an example of a result of calculation of a voice transmission volume on the basis of an input voice transmission signal by a voice transmission volume calculation unit according to the first embodiment.

FIGS. 4A and 4B each illustrate an example in which a magnitude of an audio signal of sampling frequency 8 kHz is calculated in accordance with the equation (1), with the initial value of 0.03 and τ=0.9999. FIG. 4A is a graph whose horizontal axis represents time and whose vertical axis represents voice transmission input signal si. Also, FIG. 4B is a graph whose horizontal axis represents time and whose vertical axis represents voice transmission volume sv.

The voice reception volume calculation unit 111 calculates the sound volume of the voice reception input signal ri, and supplies the obtained voice reception volume rv to the adaptive gain deciding unit 112. The definition and the calculation method of the sound volume preferably use the same method and the same parameter (the same value of τ) as the voice transmission volume calculation unit 110, but are not limited thereto.

The adaptive gain deciding unit 112 decides and outputs the adaptive gain G on the basis of the voice transmission volume sv, the voice reception volume rv, and the relative volume instruction value V. G is decided such that G weakly increases with regard to sv and V, and weakly decreases with regard to rv. The decision method of G may use any method as long as it is a method that satisfies the relationship between sv, rv, and V, but preferably uses equation (2).

$$G = \frac{sv \cdot V}{rv} \quad (2)$$

The decision method of G is not limited to a continuous function such as the equation (2) as a matter of course, but can employ various decision methods. For example, G may be decided in accordance with a table illustrated in FIG. 5. FIG. 5 is a table that sets the value of G for each range of the value of "(sv·V)/rv". For example, in FIG. 5, G is equal to 0.5, when "(sv·V)/rv" is less than 0.3. Also, in FIG. 5, G is equal to 0.7, when "(sv·V)/rv" is 0.3 or more and less than 0.7. Further, in FIG. 5, G is equal to 1.0, when "(sv·V)/rv" is 0.7 or more and less than 1.4. Furthermore, in FIG. 5, G is equal to 1.4, when "(sv·V)/rv" is 1.4 or more and less than 3.3. Also, in FIG. 5, G is equal to 2.0, when "(sv·V)/rv" is 3.3 or more.

G smoothly changes with the change of the voice transmission input signal si and the voice reception input signal ri, and thus the decision of the adaptive gain G based on the equation (2) has an advantage that abnormal noise is less likely to occur. On the other hand, the decision of G based on the table of FIG. 5 has an advantage that stability can be obtained such that G does not change even when the voice transmission input signal si and the voice reception input signal ri change minutely, and an advantage that G can be flexibly decided with regard to the voice transmission volume sv and the voice reception volume rv.

(A-3) Effect of First Embodiment

According to the first embodiment, the following effect is achieved.

In the telephone apparatus 1000, the sound volume released from the sound release device 6 is desirably controlled in accordance with a situation of a near end side. The situation of the near end side relevant to the sound release volume of the voice reception signal (the sound volume released from the sound release device 6) can be understood by utilizing the habit of a person relevant to the following speech sound volume (the speech sound volume of the near end speaker).

For example, when the surroundings of the near end speaker (the telephone apparatus 1000) is a quiet situation (when the background noise is small), or when confidentiality of the content spoken by the near end speaker (the content of conversation) is high, the near end speaker tends to reduce the speech sound volume. Also, for example, when the surroundings of the near end speaker (the telephone apparatus 1000) is bustling (when the background noise is large), or when the voice of the far end speaker is small and difficult to catch (when the sound release volume of the voice reception signal is weak), the near end speaker tends to increase the speech sound volume.

That is, in the telephone apparatus 1000, when the speech sound volume of the near end speaker is small, the sound release volume (the sound volume released from the sound release device 6) may be small or is preferable to be set small, and when the speech sound volume of the near end speaker is large, the sound release volume is preferable to be set large. Note that, when the sound volume of the voice reception input signal is made constant by using the voice level automatic adjustment (also referred to as the automatic gain control) technology described in JP 2000-151313A, the problem due to the functional limit is solved, but the problem due to the lack of know-how or the problem due to the operation difficult state is unable to be solved.

Hence, the telephone apparatus 1000 (the signal processing device 100) according to the first embodiment decides the adaptive gain according to the ratio of the sound volumes of the voice transmission input signal and the voice reception input signal, and controls the sound volume of the voice reception output signal. Thereby, in the telephone apparatus 1000 (the signal processing device 100) according to the first embodiment, the sound release volume of the voice reception signal becomes a sound volume suitable for the situation of the near end side, and the preferable bidirectional telephone call is enabled.

(B) Second Embodiment

In the following, a signal processing device, a program, a method, and a telephone apparatus according to a second embodiment of the present invention will be described in detail with reference to drawings.

(B-1) Configuration of Second Embodiment

A configuration of a telephone apparatus 1000A according to the second embodiment can also be described by using the above FIG. 1. In the following, difference in the configurations between the first embodiment and the second embodiment will be described.

The telephone apparatus 1000A according to the second embodiment differs from the first embodiment in that the signal processing device 100 is replaced by a signal processing device 200.

The signal processing device 100 according to the first embodiment uses both the voice transmission volume sv and the voice reception volume rv in order to decide the adaptive gain G. However, the calculation result of the sound volume may become a very small value, depending on the length of a soundless section, a background noise level, or a sound volume calculation method to be used. If it is possible that the voice reception volume rv becomes a very small value, a measure has to be taken to prevent G from becoming an abnormal value, and the decision method of G becomes cumbersome.

Thus, the signal processing device 200 according to the second embodiment is configured such that the voice reception volume rv is needless when calculating the adaptive gain, by normalizing the sound volume of the voice reception signal by using the automatic gain control technology.

Figure 6:
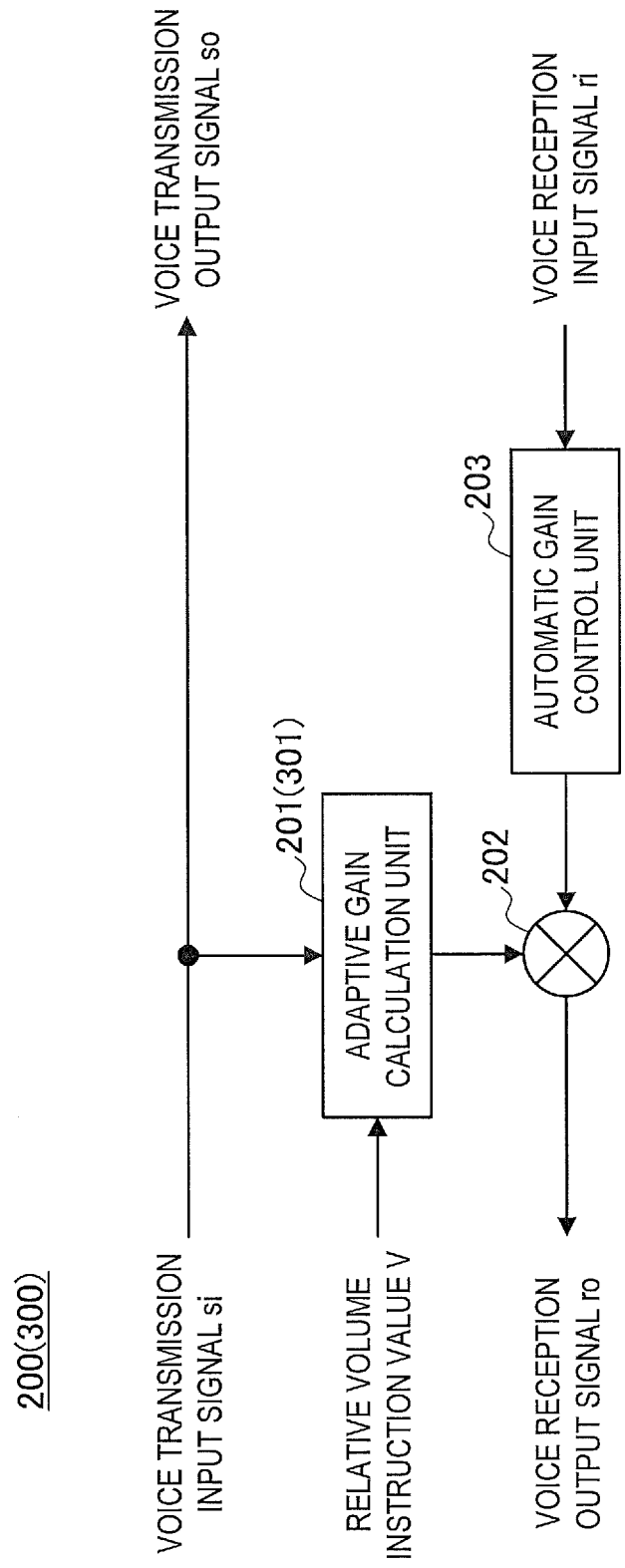
FIG. 6 is a block diagram illustrating a functional configuration of a signal processing device according to second and third embodiments.

FIG. 6 is a block diagram illustrating a functional configuration of inside of the signal processing device 200 according to the second embodiment.

Note that, in FIG. 6, the reference signs in the parentheses are the reference signs that are used in a third embodiment described later.

The signal processing device 200 according to the second embodiment includes an adaptive gain calculation unit 201 that calculates the adaptive gain G on the basis of the voice transmission input signal si and the relative volume instruction value V, an automatic gain control unit 203 that calculates a voice reception normalization signal rn by normalizing the sound volume of the voice reception input signal ri, and a multiplication unit 202 that obtains the voice reception output signal ro by multiplying the voice reception normalization signal rn by the adaptive gain G.

Figure 7:
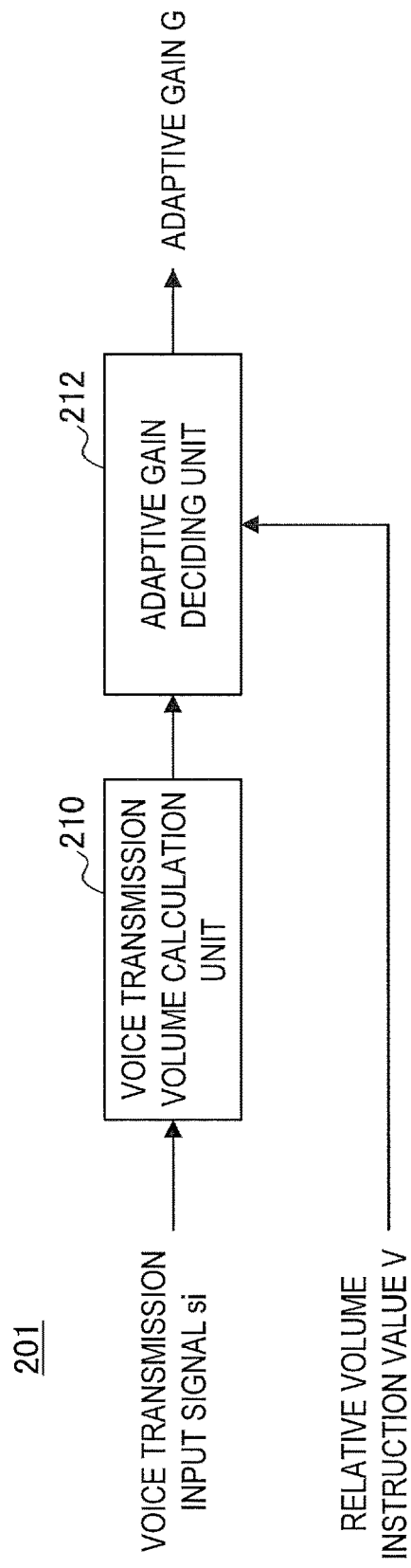
FIG. 7 is a block diagram illustrating a functional configuration of inside of an adaptive gain acquisition unit according to the second embodiment.

FIG. 7 is a block diagram illustrating a functional configuration of inside of the adaptive gain calculation unit 201.

The adaptive gain calculation unit 201 includes a voice transmission volume calculation unit 210 that calculates the sound volume of the voice transmission input signal si (i.e. the voice transmission volume sv), and an adaptive gain deciding unit 212 that decides the adaptive gain G on the basis of the voice transmission volume sv and the relative volume instruction value V.

(B-2) Operation of Second Embodiment

Next, the operation (a signal processing method according to the embodiment) of the signal processing device 200 constituting the telephone apparatus 1000A according to the second embodiment that has the above described configuration will be described with reference to FIG. 6.

The adaptive gain calculation unit 201 calculates the adaptive gain G on the basis of the voice transmission input signal si and the relative volume instruction value V, and supplies the obtained adaptive gain G to the multiplication unit 202. G is decided such that G weakly increases with regard to the sound volume of si and V. The detailed operation of the adaptive gain calculation unit 201 will be described later.

The automatic gain control unit 203 normalizes the sound volume of the voice reception input signal ri, and supplies the obtained voice reception normalization signal rn to the multiplication unit 202. Any method can be used to normalize the sound volume, and the rn of which short-time average power becomes a target value can be obtained by using the technology described in JP 2000-151313A, for example.

The multiplication unit 202 multiplies the voice reception normalization signal rn by the adaptive gain G, and outputs the obtained voice reception output signal ro.

Next, the detailed operation of the adaptive gain calculation unit 201 will be described with reference to FIG. 6.

The voice transmission volume calculation unit 210 calculates the sound volume of the voice transmission input signal si, and supplies the obtained voice transmission volume sv to the adaptive gain deciding unit 212. The operation of the voice transmission volume calculation unit 210 is the same as the operation of the voice transmission volume calculation unit 110 according to the first embodiment.

The adaptive gain deciding unit 212 decides and outputs the adaptive gain G on the basis of the voice transmission volume sv and the relative volume instruction value V. G is decided such that G weakly increases with regard to sv and V. The decision method of G may use any method as long as it is a method that satisfies a relationship with sv and V, but it is preferable to use equation (3).

$$G = sv \cdot V \quad (3)$$

The decision method of G is not limited to a continuous function such as the equation (3) as a matter of course, but can employ various decision methods. For example, G may be decided in accordance with a table illustrated in FIG. 8. FIG. 8 illustrates a table in which a value of G is set for each range of the value of "sv·V". For example, in FIG. 8, G is equal to 0.5, when "sv·V" is smaller than 0.3. Also, in FIG. 8, G is equal to 0.7, when "sv·V" is 0.3 or more and less than 0.7. Further, in FIG. 8, G is equal to 1.0, when "sv·V" is 0.7 or more and less than 1.4. Furthermore, in FIG. 8, G is equal to 1.4, when "sv·V" is 1.4 or more and less than 3.3. Also, in FIG. 8, G is equal to 2.0, when "sv·V" is 3.3 or more.

G smoothly changes with the change of the voice transmission input signal si, and thus the decision of the adaptive gain G by the equation (3) has an advantage that abnormal noise is less likely to occur. On the other hand, the decision of G by the table of FIG. 8 has an advantage that the stability can be obtained such that G does not change even if the voice transmission input signal si changes minutely, and an advantage that G is flexibly decided with regard to the voice transmission volume sv.

(B-3) Effect of Second Embodiment

According to the second embodiment, the following effect is achieved.

In the signal processing device 200 constituting the telephone apparatus 1000A of the second embodiment, when the adaptive gain is decided, the sound volume of the voice reception input signal does not have to be used, and therefore the adaptive gain can be calculated more stably.

Thereby, in the telephone apparatus 1000A, preferable bidirectional telephone call is enabled.

(C) Third Embodiment

In the following, a signal processing device, a program, a method, and a telephone apparatus according to a third embodiment of the present invention will be described in detail with reference to drawings.

(C-1) Configuration of Third Embodiment

A configuration of the telephone apparatus 1000B according to the third embodiment can also be described by using the above described FIG. 1. In the following, the difference in the configuration between the second embodiment and the third embodiment will be described.

The telephone apparatus 1000B according to the third embodiment differs from the second embodiment in that the signal processing device 200 is replaced by a signal processing device 300.

In the first and second embodiments, the background noise of the near end side is not considered in the calculation of the adaptive gain G. Thus, if the user sets the relative volume instruction value V at a small value, it is possible that the voice reception signal released from the sound release device is too small, drowned out in the background noise, and is difficult to catch.

Thus, in the configuration according to the third embodiment, when the sound volume of the voice transmission input signal si is calculated, it is determined whether or not it is a voice section, a noise volume nv is calculated in addition to the voice transmission volume sv, and the sound volume of the voice reception output signal ro is prevented from becoming too smaller than the background noise.

The signal processing device 300 according to the third embodiment can also be described by using the above described FIG. 6.

As illustrated in FIG. 6, the signal processing device 300 according to the third embodiment differs from the second embodiment in that the adaptive gain calculation unit 201 is replaced by an adaptive gain calculation unit 301.

Figure 9:
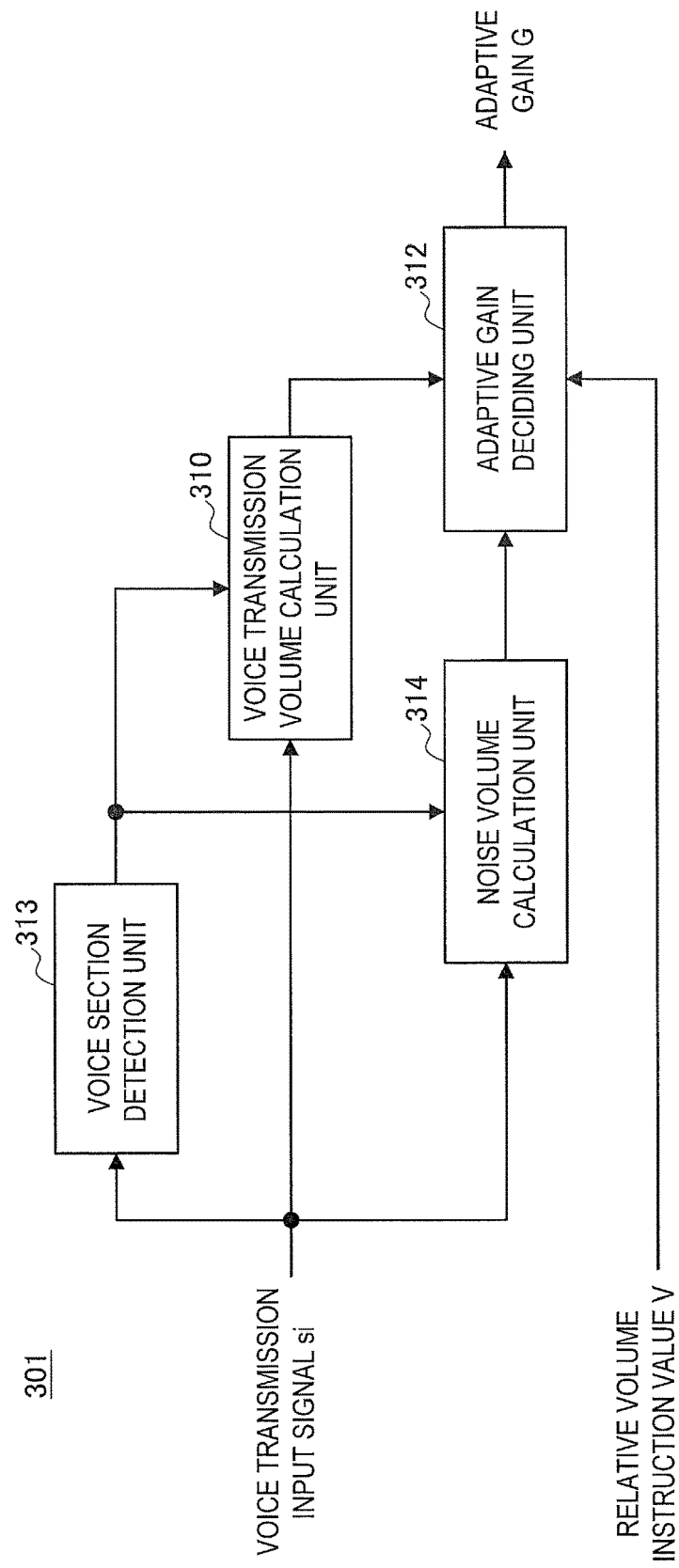
FIG. 9 is a block diagram illustrating a functional configuration of inside of an adaptive gain acquisition unit according to the third embodiment.

FIG. 9 is a block diagram illustrating a functional configuration of inside of the adaptive gain calculation unit 301 according to the third embodiment.

As illustrated in FIG. 9, the adaptive gain calculation unit 301 includes a voice section detection unit 313 that detects a voice section by analyzing the voice transmission input signal si, a voice transmission volume calculation unit 310 that calculates a sound volume (i.e. the voice transmission volume sv) of the voice transmission input signal si, a noise volume calculation unit 314 that calculates a sound volume (i.e. the noise volume nv) of the background noise of the near end side, and an adaptive gain deciding unit 312 that decides the adaptive gain G on the basis of the voice transmission volume sv, the noise volume nv, and the relative volume instruction value V.

(C-2) Operation of Third Embodiment

The operation (the signal processing method according to the embodiment) of the signal processing device 300 constituting the telephone apparatus 1000B according to the third embodiment that has the above described configuration can be described in a way similar to the operation of the signal processing device 200 according to the second embodiment, and thus the detailed description will be omitted here.

Next, the detailed operation of the adaptive gain calculation unit 301 constituting the signal processing device 300 according to the third embodiment will be described by using FIG. 9.

The voice section detection unit 313 analyzes the voice transmission input signal si, and detects whether or not the voice transmission input signal si input at the present moment is voice, and supplies the obtained voice section detection result D to the voice transmission volume calculation unit 310 and the noise volume calculation unit 314. Any publicly known method can be used as the method for detecting the voice section. As the most simple and convenient method, there is a method that determines a section as a voice section if the average magnitude (which may be the power) of several ten milliseconds to several hundred milliseconds is larger than a predetermined threshold value. Also, if the technology described in JP 2012-215600A or the like is used, the voice section can be detected with higher accuracy.

The voice transmission volume calculation unit 310 calculates the sound volume of the voice transmission input signal si only in the voice section, and supplies the obtained voice transmission volume sv to the adaptive gain deciding unit 312. The operation of the voice transmission volume calculation unit 210 is the same as the operation of the voice transmission volume calculation unit 110 according to the first embodiment, except for calculating the sound volume only when the voice section detection result shows the voice section. In a way similar to the first and second embodiments, the value obtained by estimating the average value of the absolute value (magnitude) of the signal by using a time constant filter is referred to as "sound volume". The voice transmission volume calculation unit 310 calculates the voice transmission volume sv by equation (4), where the current voice transmission input signal is si, the one-sample previous voice transmission volume is sv', and the time constant is $\tau$ ($0<\tau<1$).

$$sv = \begin{cases} (\tau-1)\cdot|si| + \tau\cdot sv' & (D = \text{voice section}) \\ sv' & (D \neq \text{voice section}) \end{cases} \quad (4)$$

The noise volume calculation unit 314 calculates the sound volume of the voice transmission input signal si only outside the voice section, and supplies the obtained noise volume nv to the adaptive gain deciding unit 312. The operation of the noise volume calculation unit 314 is the same as the operation of the voice transmission volume calculation unit 110 according to the first embodiment, except for calculating the sound volume only when the voice section detection result does not show the voice section. The value obtained by estimating the average value of the absolute value (magnitude) of the signal by using the time constant filter is referred to as "sound volume", in a way similar to the voice transmission volume calculation unit 310. The noise volume calculation unit 314 calculates the noise volume nv by the equation (5), where the current voice transmission input signal is si, the one-sample previous voice transmission volume is nv', and the time constant is $\tau$ ($0<\tau<1$).

$$nv = \begin{cases} (\tau-1)\cdot|si| + \tau\cdot nv' & (D \neq \text{voice section}) \\ nv' & (D = \text{voice section}) \end{cases} \quad (5)$$

The adaptive gain deciding unit 312 decides and outputs the adaptive gain G on the basis of the voice transmission volume sv, the noise volume nv, and the relative volume instruction value V. G is decided by calculating a voice transmission adaptive gain Gs decided such that Gs weakly increases with regard to sv and V and a noise adaptive gain Gn decided such that Gn weakly increases with regard to nv and setting the larger one among Gs and Gn as G (equation (6)).

$$G=\max\{Gs, Gn\} \qquad (6)$$

The voice transmission adaptive gain Gs is decided in a way similar to the adaptive gain G according to the second embodiment.

The decision method of the noise adaptive gain Gn may use any method as long as it is a method that satisfies the relationship with nv, but Gn is preferably decided by equation (7) by setting a predetermined noise relative volume instruction value Vn in advance. Vn is preferably set at 1.4 or 2.0, for example.

$$Gn=nv \cdot Vn \qquad (7)$$

(C-3) Effect of Third Embodiment

According to the third embodiment, the following effect is achieved.

In the signal processing device 300 constituting the telephone apparatus 1000B according to the third embodiment, the adaptive gain is decided in consideration of the background noise level of the near end side, and thus the voice reception output signal can be released in the sound release volume that is not drowned out by the background noise. Thereby, in the telephone apparatus 1000B, bidirectional telephone call that allows more preferable telephone call than the second embodiment is enabled.

(D) Fourth Embodiment

In the following, a signal processing device, a program, a method, and a telephone apparatus according to a fourth embodiment of the present invention will be described in detail with reference to drawings.

(D-1) Configuration of Fourth Embodiment

A configuration of a telephone apparatus 1000C according to the fourth embodiment can also be described by using the above described FIG. 1. In the following, difference in the configuration between the first embodiment and the fourth embodiment will be described.

The telephone apparatus 1000C according to the fourth embodiment differs from the first embodiment in that the signal processing device 100 is replaced by a signal processing device 400.

In the first to third embodiments, the influence of the echo of the voice reception signal from the sound release device 6 to the sound collection device 8 is not considered. Thus, if the user sets the relative volume instruction value V at a large value, it is possible that the voice reception signal released from the sound release device 6 is too large, is collected by the sound collection device 8, and transmitted to the far end side as an echo. Thus, the signal processing device 400 according to the fourth embodiment is configured to prevent the echo from being generated by estimating and considering the gain of the echo path 7.

Figure 10:
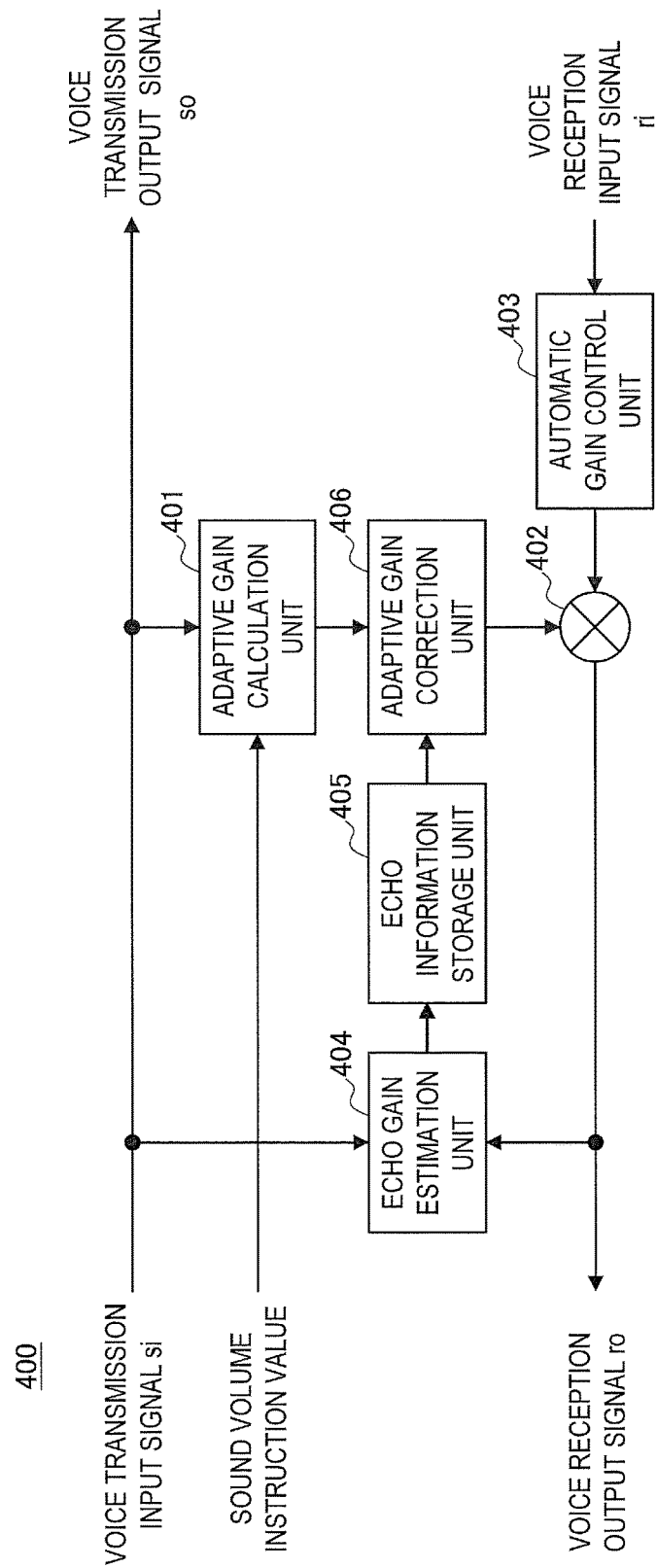
FIG. 10 is a block diagram illustrating a functional configuration of a signal processing device according to a fourth embodiment.

FIG. 10 is a block diagram illustrating a functional configuration of inside of the signal processing device 400.

As illustrated in FIG. 10, the signal processing device 400 of the fourth embodiment includes an echo gain estimation unit 404 that estimates the gain of the echo path on the basis of the voice transmission input signal si and the voice reception output signal ro, an echo information storage unit 405 that stores the estimated echo gain EG estimated by the echo gain estimation unit 404, an adaptive gain calculation unit 401 that calculates an interim adaptive gain G0 on the basis of the voice transmission input signal si and the relative volume instruction value V, an adaptive gain correction unit 406 that calculates the adaptive gain G by correcting the interim adaptive gain G0 on the basis of the estimated echo gain EG one sample before, an automatic gain control unit 403 that calculates the voice reception normalization signal rn by normalizing the sound volume of the voice reception input signal ri, and a multiplication unit 402 that obtains the voice reception output signal ro by multiplying the voice reception normalization signal rn by the adaptive gain G.

Figure 11:
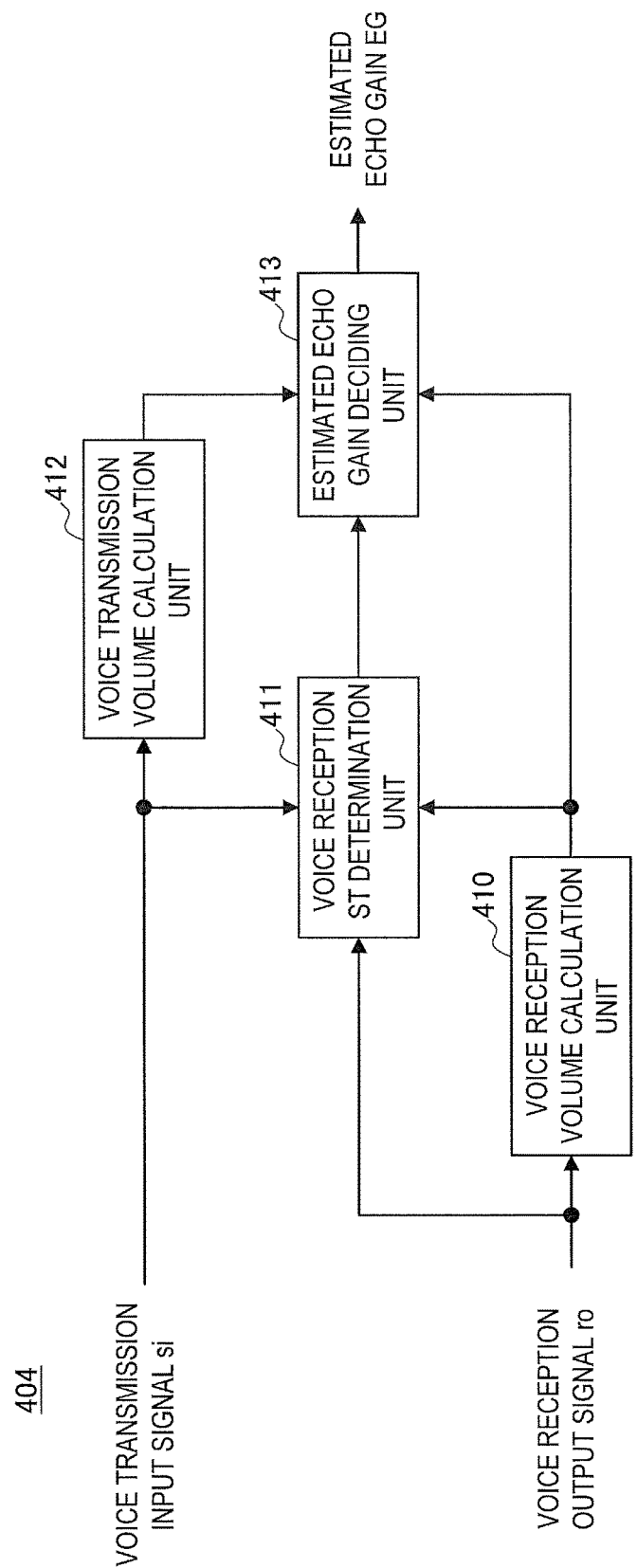
FIG. 11 is a block diagram illustrating a functional configuration of inside of an adaptive gain acquisition unit according to the fourth embodiment.

FIG. 11 is a block diagram illustrating a functional configuration of inside of the echo gain estimation unit 404.

As illustrated in FIG. 11, the echo gain estimation unit 404 includes a voice reception volume calculation unit 410, a voice reception ST determination unit 411, a voice transmission volume calculation unit 412, and an estimated echo gain deciding unit 413.

The voice reception volume calculation unit 410 calculates the voice reception volume rv on the basis of the voice reception output signal ro.

The voice reception ST determination unit 411 determines whether or not the echo of the voice reception output signal ro is included in the corresponding (detail is described later in the description of operation) voice transmission input signal si and the speech of the near end side is not generated (i.e., the voice reception single talk (ST) state), on the basis of the voice transmission input signal si, the voice reception output signal ro, and the voice reception volume rv, and outputs a voice reception ST determination result J.

The voice transmission volume calculation unit 412 calculates the voice transmission volume sv on the basis of the voice transmission input signal si.

The estimated echo gain deciding unit 413 decides the estimated echo gain EG on the basis of the voice transmission volume sv, the voice reception volume rv, and the voice reception ST determination result J.

(D-2) Operation of Fourth Embodiment

Next, operation (the signal processing method according to the embodiment) of the signal processing device 400 constituting the telephone apparatus 1000C according to the second embodiment that has the above described configuration will be described by using FIG. 10.

The echo gain estimation unit 404 estimates the gain of the echo path on the basis of the voice transmission input signal si and the voice reception output signal ro, and supplies the obtained estimated echo gain EG to the echo information storage unit 405. Although the estimation of the gain of the echo path can be calculated from an estimated echo property (in many cases, supplied as an FIR filter coefficient) by using the configuration of a part of the echo canceller as in JP 2009-21859A for example, it is preferable to use a simpler method described later. Note that the calculation method of the estimated echo gain EG is not limited to the method described later.

The echo information storage unit 405 stores the estimated echo gain, and supplies the estimated echo gain to the adaptive gain correction unit 406 one sample later. That is, the echo information storage unit 405 operates in a way similar to a delay device.

The operation of the adaptive gain calculation unit 401 is similar to the operations of the adaptive gain calculation unit 201 according to the second embodiment or the adaptive gain calculation unit 301 according to the third embodiment. However, the adaptive gain calculation unit 401 differs from the adaptive gain calculation unit 201 or 301 only in that the adaptive gain calculation unit 201 or 301 outputs the adaptive gain G whereas the adaptive gain calculation unit 401 outputs the same value as the interim adaptive gain G0.

The adaptive gain correction unit 406 corrects the interim adaptive gain G0 on the basis of the estimated echo gain EG one sample before, and supplies the obtained adaptive gain G to the multiplication unit 402. The correction operates such that a synthetic gain CG which is a product of the estimated echo gain EG and the adaptive gain G becomes a predetermined maximum synthetic gain Gmax or less (equation (8)).

$$G = \min\left\{G0, \frac{G\max}{EG}\right\} \quad (8)$$

The operations of the automatic gain control unit 403 and the multiplication unit 402 can be respectively described in a way similar to the operations of the automatic gain control unit 203 and the multiplication unit 202 according to the second embodiment, and thus the details thereof will be omitted.

Next, the detailed operation of the echo gain estimation unit 404 will be described by using FIG. 11.

The voice reception volume calculation unit 410 calculates the sound volume of the voice reception output signal ro, and supplies the obtained voice reception volume rv to the voice reception ST determination unit 411 and the estimated echo gain deciding unit 413. The calculation method of the sound volume is the same as the voice reception volume calculation unit 111 according to the first embodiment in principle. However, in the voice reception volume calculation unit 111, if the voice reception volume rv changes quickly, the adaptive gain G also changes quickly, and the sound quality of the voice reception output signal ro degrades. However, in the voice reception volume calculation unit 410, if the change of the voice reception volume rv is slow, switching between a voice reception ST state and a non-voice reception ST state (a voice transmission ST state or a double talk state) is not performed in time. Thus, a sound volume in a short section of approximately several ten milliseconds is necessary, and the time constant τ of around 0.99 is preferable.

The voice reception ST determination unit 411 determines whether or not the apparatus is in the voice reception ST state on the basis of the voice transmission input signal si, the voice reception output signal ro, and the voice reception volume rv, and supplies the obtained voice reception ST determination result J to the estimated echo gain deciding unit 413.

It is possible to check whether or not the apparatus is in the voice reception ST state by using the following two conditions. When both the following first condition and second condition are satisfied, it can be determined that the apparatus is in the voice reception ST state. The first condition for determining whether or not the apparatus is in the voice reception ST state is a condition "rv is sufficiently large". In addition, the second condition for determining whether or not the apparatus is in the voice reception ST state is a condition "correlation coefficient between si and ro is sufficiently large" (the correlation coefficient is a predetermined value or more).

Note that the echo of ro included in si is affected by the delay in the echo path, and thus a correct result is not obtained even if the correlation coefficient is calculated at the same time point. Thus, first, a predetermined maximum delay amount DLmax is defined. Also, L is the number of samples necessary for the calculation of the correlation coefficient. In addition, the voice reception ST determination unit 411 stores the voice reception output signal ro of L samples, and the voice transmission input signal si of (L+DLmax) samples. Then, a cross-correlation function (which is the correlation coefficient calculated for each sample delay) of the stored ro and si is calculated to obtain the maximum value R of the cross-correlation function and the delay of that time (that is, the estimation echo delay EDL). Then, if rv is larger than a predetermined voice reception volume threshold value Trv and R is larger than a predetermined correlation coefficient threshold value TR, the voice reception ST determination value JST is set to 1, and otherwise the voice reception ST determination value JST is set to 0. Then, a set of the JST and the EDL is supplied to the estimated echo gain deciding unit 413 as the voice reception ST determination result J. A preferable value of a predetermined voice reception volume threshold value Trv varies depending on the scale of the magnitude value of ro (for example, an integer value of −32768 to +32767, or a real number value of −1.0 to +1.0) or the calculation method of the sound volume. However, the background noise level (far end side noise volume) of ro is estimated and set at approximately twice the far end side noise volume. Also, a predetermined correlation coefficient threshold value TR is preferably 0.9.

The voice transmission volume calculation unit 412 calculates the sound volume of the voice transmission input signal si, by using the same calculation method as the voice reception volume calculation unit 410, and supplies the obtained voice transmission volume sv to the estimated echo gain deciding unit 413.

The estimated echo gain deciding unit 413 decides and outputs the estimated echo gain EG on the basis of the voice reception ST determination result J, the voice transmission volume sv, and the voice reception volume rv. The estimated echo gain deciding unit 413 stores sv of the past (DLmax−1) samples. Then, if JST=0, EG one sample before is output as a current EG. Then, if JST=1, the sv before EDL sample is divided by the current rv to calculate EG.

(D-3) Effect of Fourth Embodiment

According to the fourth embodiment, the following effect is achieved.

The signal processing device 400 constituting the telephone apparatus 1000C according to the fourth embodiment corrects the adaptive gain in consideration of the gain of the echo path, and thus can prevent the echo and the howling even when the user increases the relative volume instruction value too much. Thereby, by using the telephone apparatus 1000C, more preferable bidirectional telephone call is enabled as compared with the first to third embodiments.

(E) Fifth Embodiment

In the following, a signal processing device, a program, a method, and a telephone apparatus according to a fifth embodiment of the present invention will be described in detail with reference to drawings.

(E-1) Configuration of Fifth Embodiment

A configuration of a telephone apparatus 1000D according to the fifth embodiment can also be described by using the above described FIG. 2. In the following, the difference in the configuration between the fifth embodiment and the first to fourth embodiments will be described.

The telephone apparatus 1000D according to the fifth embodiment differs from the fourth embodiment in that the signal processing device 400 is replaced by a signal processing device 500.

In the first to fourth embodiments, the echo is not removed. Thus, in the first to third embodiments, if the user increases the relative volume instruction value too much, it is possible that the echo or howling occurs. Also, it is difficult to prevent the echo completely in the fourth embodiment as well. Thus, the signal processing device 500 according to the fifth embodiment is configured to include an echo canceller (hereinafter referred to as "echo removal unit"). In the signal processing device 500, if the echo removal unit performs intended operation, the echo does not remain in the voice transmission output signal so regardless of the gain of the echo path, and therefore adaptation according to the gain of the echo path and the correction of the gain become unnecessary.

Figure 12:
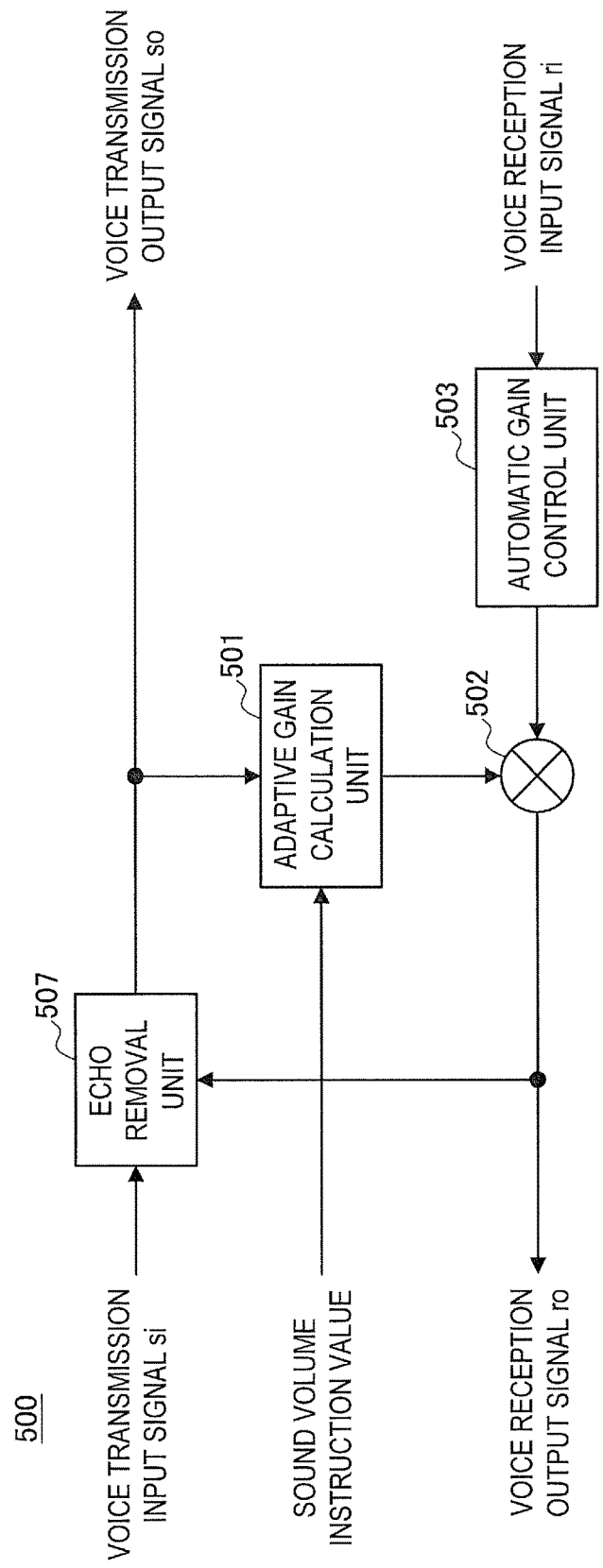
FIG. 12 is a block diagram illustrating a functional configuration of a signal processing device according to a fifth embodiment.

FIG. 12 is a block diagram illustrating a functional configuration of inside of the signal processing device 500.

The signal processing device 500 according to the fifth embodiment includes an echo removal unit 507 that obtains the voice transmission output signal so generated by removing the echo from the voice transmission input signal si on the basis of the voice transmission input signal si and the voice reception output signal ro, an adaptive gain calculation unit 501 that calculates the adaptive gain G on the basis of the voice transmission output signal so and the relative volume instruction value V, an automatic gain control unit 503 that calculates the voice reception normalization signal rn by normalizing the sound volume of the voice reception input signal ri, and a multiplication unit 502 that obtains the voice reception output signal ro by multiplying the voice reception normalization signal rn by the adaptive gain G.

(E-2) Operation of Fifth Embodiment

Next, the operation (the signal processing method according to the embodiment) of the signal processing device 500 constituting the telephone apparatus 1000D according to the fifth embodiment that has the above described configuration will be described by using FIG. 12.

The echo removal unit 507 removes the echo component of the voice reception output signal ro included in the voice transmission input signal si, and supplies the obtained voice transmission output signal so to the adaptive gain calculation unit 501. The removal method of the echo component can use any publicly known technologies, and can use the technology described in JP 2009-21859A or the technology described in JP 2016-025425A for example.

The operation of the adaptive gain calculation unit 501 is similar to the adaptive gain calculation unit 201 according to the second embodiment or the adaptive gain calculation unit 301 according to the third embodiment. However, the adaptive gain calculation unit 501 differs from the adaptive gain calculation unit 201 or 301 in that the voice transmission input signal si is supplied to the adaptive gain calculation unit 201 or 301 whereas the voice transmission output signal so obtained from the echo removal unit 507 is supplied to the adaptive gain calculation unit 501.

The operations of the automatic gain control unit 503 and the multiplication unit 502 can be respectively described in a way similar to the operations of the automatic gain control unit 203 and the multiplication unit 202 according to the second embodiment, and thus the detail will be omitted.

(E-3) Effect of Fifth Embodiment

According to the fifth embodiment, the following effect is achieved.

In the signal processing device 500 constituting the telephone apparatus 1000D according to the fifth embodiment, the echo is removed, and thus even when the user increases the relative volume instruction value too much, the echo or howling can be prevented. Thereby, according to the fifth embodiment, more preferable telephone call is enabled as compared with the first to fourth embodiments.

(F) Sixth Embodiment

In the following, a signal processing device, a program, a method, and a telephone apparatus according to a sixth embodiment of the present invention will be described in detail with reference to drawings.

(F-1) Configuration of Sixth Embodiment

A configuration of a telephone apparatus 1000E according to the sixth embodiment can also be described by using the above described FIG. 1. In the following, difference in the configuration between the fifth embodiment and the sixth embodiment will be described.

The telephone apparatus 1000E according to the sixth embodiment differs from the fifth embodiment in that the signal processing device 500 is replaced by a signal processing device 600.

In the fifth embodiment, correction of the adaptive gain based on the estimated echo gain according to the fourth embodiment is not included. However, during initial learning of the echo removal unit, or immediately after echo path fluctuation at which learning of the echo path is insufficient, the echo is unable to be removed completely. At this time, if the user increases the relative volume instruction value too much, it is possible that the echo or howling occurs. Thus, the sixth embodiment is configured such that a unit for correcting the adaptive gain on the basis of the estimated echo gain is added to the configuration of the fifth embodiment.

Figure 13:
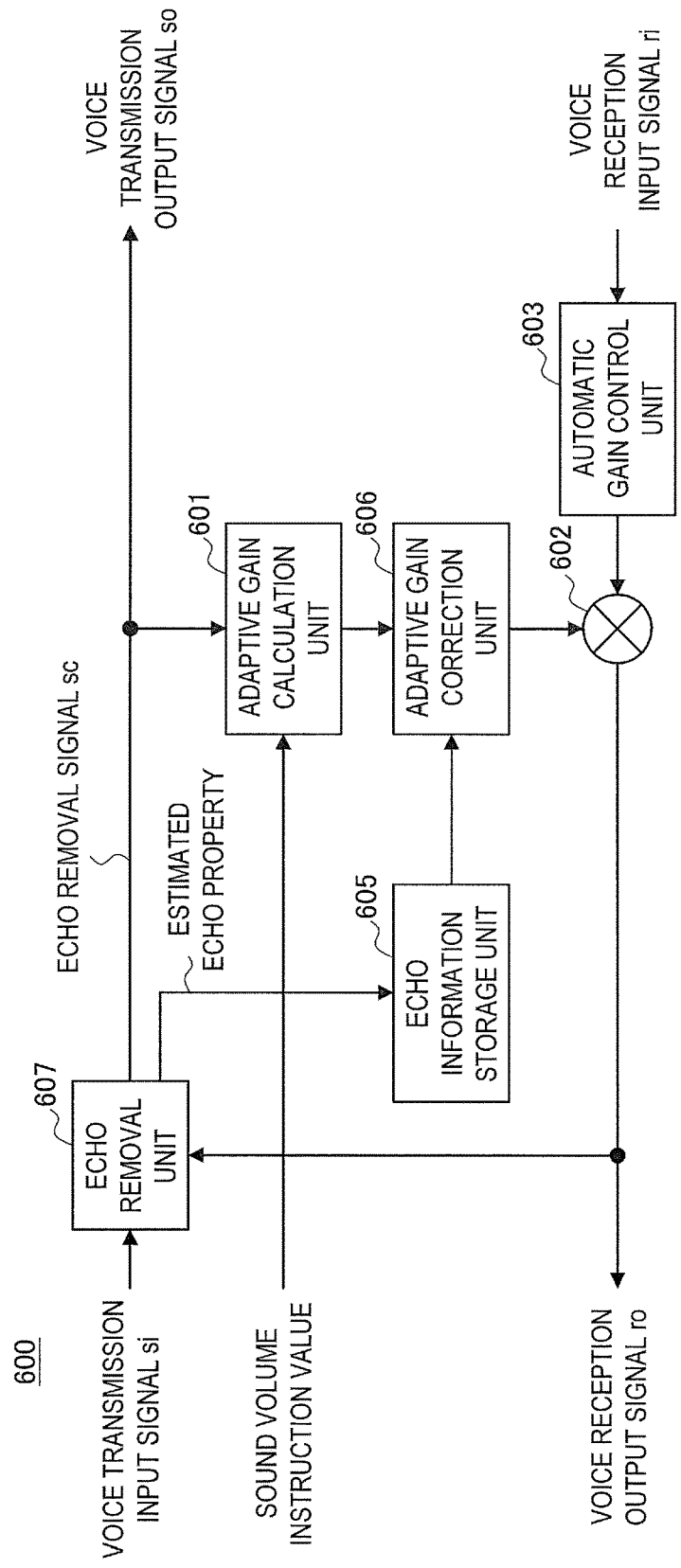
FIG. 13 is a block diagram illustrating a functional configuration of a signal processing device according to a sixth embodiment.

FIG. 13 is a block diagram illustrating a functional configuration of inside of the signal processing device 600.

As illustrated in FIG. 13, the signal processing device 600 includes an adaptive gain calculation unit 601, a multiplication unit 602, an automatic gain control unit 603, an echo information storage unit 605, an adaptive gain correction unit 606, and an echo removal unit 607.

The echo removal unit 607 obtains the voice transmission output signal so generated by removing the echo from the voice transmission input signal si on the basis of the voice transmission input signal si and the voice reception output signal ro.

The echo information storage unit 605 stores an estimated echo property ER estimated by the echo removal unit 607.

The adaptive gain calculation unit 601 calculates the interim adaptive gain G0 on the basis of the voice transmission output signal so and the relative volume instruction value V.

The adaptive gain correction unit 606 corrects the interim adaptive gain G0 and calculates the adaptive gain G, on the basis of the estimated echo property ER one sample before.

The automatic gain control unit 603 normalizes the sound volume of the voice reception input signal ri, and calculates the voice reception normalization signal rn.

The multiplication unit 602 multiplies the voice reception normalization signal rn by the adaptive gain G, and obtains the voice reception output signal ro.

(F-2) Operation of Sixth Embodiment

Next, the operation (the signal processing method according to the embodiment) of the signal processing device 600 constituting the telephone apparatus 1000E according to the sixth embodiment that has the above described configuration will be described by using FIG. 13.

The operation of the echo removal unit 607 is similar to the operation of the echo removal unit 507 according to the fifth embodiment, except for supplying the property (the FIR filter coefficient or the estimation value of the frequency property of the echo path) of the echo path estimated to remove the echo to the echo information storage unit 605 as the estimated echo property ER, in addition to supplying the echo removal signal sc (the same value as the voice transmission output signal so) to the adaptive gain calculation unit 601.

The operation of the echo information storage unit 605 is substantially the same as the operation of the echo information storage unit 405 according to the fourth embodiment. Although the information stored in the echo information storage unit 405 is the estimated echo gain according to the fourth embodiment, the echo information storage unit 605 differs from the echo information storage unit 405 in that the estimated echo property is stored.

The operation of the adaptive gain calculation unit 601 is similar to the operation of the adaptive gain calculation unit 401 according to the fourth embodiment.

The operation of the adaptive gain correction unit 606 is the same as the operation of the adaptive gain correction unit 406 according to the fourth embodiment, except for calculating the estimated echo gain EG one sample before from the estimated echo property ER one sample before. The estimated echo gain EG can be calculated by root sum square if the estimated echo property ER is the FIR filter coefficient for example, and can be calculated by root mean square of the absolute value if the estimated echo property ER is the frequency property for example.

The operations of the automatic gain control unit 603 and the multiplication unit 602 are respectively similar to the operations of the automatic gain control unit 403 and the multiplication unit 402 according to the fourth embodiment.

(F-3) Effect of Sixth Embodiment

According to the sixth embodiment, the following effect is achieved.

In the signal processing device 600 constituting the telephone apparatus 1000E according to the sixth embodiment, the echo removal unit removes the echo during performing an intended operation, and the adaptive gain is corrected even when the echo removal unit is unable to remove the echo during initial learning or due to fluctuation of the echo path, and thus the echo and howling can always be prevented even when the user increases the relative volume instruction value too much. Thereby, in the sixth embodiment, more preferable telephone call is enabled as compared with the fifth embodiment.

(G) Another Embodiment

The present invention is not limited to the respective embodiments, and can include a variant embodiment described below.

(G-1) In the third embodiment, the noise relative volume instruction value Vn may be designated by the user.

Also, in the third embodiment, the noise relative volume instruction value Vn may weakly increase with regard to V, in conjunction with variation of the relative volume instruction value V. When Vn is in conjunction with variation of V, Vn is the gain for preventing the sound release volume from being drowned out in the background noise and thus is preferably 1 or more, and therefore it is desirable to use equation (9) for example. Vn is a value of 1 or more and less than 2, according to the equation (9).

$$Vn = 2 - \exp(-V) \quad (9)$$

(G-2) In the fourth embodiment, the maximum synthetic gain Gmax may be designated by the user.

(G-3) In the fourth embodiment, the maximum synthetic gain Gmax may be automatically set. For example, a predetermined maximum combined gain initial value Gmax0 is defined as a largish value such as Gmax0=10, and the initial value of Gmax is set to Gmax0. In addition, a howling detection unit is added to the configuration in order to detect howling by using any publicly known howling detection technology. Then, further, a maximum combined gain update unit is added to the configuration in order to reduce the Gmax when the howling is detected (for example, multiply Gmax by 0.9 each time the howling is detected). By updating Gmax in such a way, the maximum Gmax can be automatically set within a range in which the howling does not occur, and thus each terminal is needless to be tuned in advance.

(G-4) Although, with regard to the respective embodiments, examples in which the signal processing device according to each embodiment of the present invention is applied to the telephone apparatus (the bidirectional telephone apparatus) have been described, the signal processing device according to each of the embodiments of the present invention may be configured as an independent device (for example, configured as software on a computer, and configured with a dedicated semiconductor chip or the like).

(G-5) The signal processing devices according to the fourth to sixth embodiments include the automatic gain control unit, but may be configured without the automatic gain control unit.

(G-6) Although the signal processing devices according to the second to sixth embodiments are based on the premise that the sound volume of the voice reception signal is normalized to 1 by the automatic gain control unit, the adaptive gain G may be replaced by the adaptive gain G multiplied by a target value of a short-time average power of the automatic gain control unit, when the technology described in JP 2000-151313A is used for example.

(G-7) All of the above described embodiments are configured such that the relative volume instruction value V is designated (can be changed) by the user, but the apparatus may be configured without the volume instruction device 4, and the relative volume instruction value V may be a predetermined constant value.

The program of the embodiments may be stored in a non-transitory computer readable medium, such as a flexible disk or a CD-ROM, and may be loaded onto a computer and executed. The recording medium is not limited to a removable recording medium such as a magnetic disk or an optical disk, and may be a fixed recording medium such as a hard disk apparatus or a memory. In addition, the program of the embodiments may be distributed through a communication line (also including wireless communication) such as the Internet. Furthermore, the program may be encrypted or modulated or compressed, and the resulting program may be distributed through a wired or wireless line such as the Internet, or may be stored a non-transitory computer readable medium and distributed.

Heretofore, preferred embodiments of the present invention have been described in detail with reference to the appended drawings, but the present invention is not limited thereto. It should be understood that they will naturally come under the technical scope of the present invention.

What is claimed is:

1. A signal processing device configured to supply a voice reception output signal to a sound release device side, the voice reception output signal being based on a voice reception input signal received from far end by telephone apparatus having the sound release device and a sound collection device, and configured to transmit a voice transmission output signal to the far end side, the voice transmission output signal being based on a voice transmission input signal supplied from the sound collection device side,
the signal processing device comprising:
an adaptive gain calculation unit configured to calculate and output an adaptive gain for processing the voice reception output signal, by utilizing at least the voice transmission input signal and a relative volume value, the relative volume value indicating a predetermined relative sound volume ratio between the voice transmission input signal and the voice reception output signal; and
a multiplication unit configured to calculate the voice reception output signal by multiplying a signal based on the voice reception input signal by a value based on the adaptive gain.

2. The signal processing device according to claim 1, further comprising:
an instruction accepting unit configured to accept an input of the relative volume value.

3. The signal processing device according to claim 1, wherein
the adaptive gain calculation unit calculates and outputs the adaptive gain for processing the voice reception output signal, by utilizing the voice transmission input signal, the voice reception input signal, and the relative volume value.

4. The signal processing device according to claim 3, wherein
the adaptive gain calculation unit
weakly increases the adaptive gain with regard to a sound volume of the voice transmission input signal and the relative volume value, and
weakly decreases the adaptive gain with regard to a sound volume of the voice reception input signal.

5. The signal processing device according to claim 1, further comprising:
an automatic gain control unit configured to normalize a sound volume of the voice reception input signal, and configured to supply a normalized voice reception output signal to the multiplication unit.

6. The signal processing device according to claim 5, wherein
the adaptive gain calculation unit includes:
a voice section detection unit configured to detect whether the voice transmission input signal is a voice section on the basis of the voice transmission input signal;
a voice transmission volume calculation unit configured to calculate a sound volume in the voice section of the voice transmission input signal as a voice transmission volume on the basis of a detection result of the voice section detection unit;
a noise volume calculation unit configured to calculate a sound volume outside the voice section of the voice transmission input signal as a noise volume on the basis of the detection result of the voice section detection unit; and
an adaptive gain deciding unit configured to decide the adaptive gain to be output, on the basis of the voice transmission volume, the noise volume, and the relative volume value.

7. The signal processing device according to claim 1, further comprising:
an echo gain estimation unit configured to calculate an estimated echo gain on the basis of the voice transmission input signal and the voice reception output signal; and
an adaptive gain correction unit configured to correct the adaptive gain calculated by the adaptive gain calculation unit on the basis of the estimated echo gain calculated by the echo gain estimation unit, configured to supply the adaptive gain after the correction to the multiplication unit.

8. The signal processing device according to claim 1, further comprising:
an echo removal unit configured to generate a voice transmission input signal after echo removal by removing a component of the voice reception output signal that is mixed as an echo in the voice transmission input signal on the basis of the voice transmission input signal and the voice reception output signal, to supply the voice transmission input signal after echo removal to the adaptive gain calculation unit, and configured to supply the voice transmission input signal after echo removal as the voice transmission output signal to the far end side.

9. The signal processing device according to claim 8, wherein
the echo removal unit acquires an estimated echo property by estimating a property of an echo path, on the basis of the voice transmission input signal and the voice reception output signal, and
the signal processing device further includes an adaptive gain correction unit configured to correct the adaptive gain calculated by the adaptive gain calculation unit, on the basis of the estimated echo property obtained by the echo removal unit.

10. A telephone apparatus comprising:
a sound release device;
a sound collection device; and
a signal processing device configured to supply a voice reception output signal to the sound release device side, the voice reception output signal being based on a voice reception input signal received from far end, and configured to transmit a voice transmission output signal to the far end side, the voice transmission output signal being based on a voice transmission input signal supplied from the sound collection device side,
wherein the signal processing device is the signal processing device according to claim 1.

11. A non-transitory computer-readable storage medium storing a signal processing program causing
a computer provided in a signal processing device configured to supply a voice reception output signal to a sound release device side, the voice reception output signal being based on a voice reception input signal received from far end by telephone apparatus having a sound release device and a sound collection device, and configured to transmit a voice transmission output signal to the far end side, the voice transmission output signal being based on a voice transmission input signal supplied from the sound collection device side, to function as:

an adaptive gain calculation unit configured to calculate and output an adaptive gain for processing the voice reception output signal, by utilizing at least the voice transmission input signal and a relative volume value, the relative volume value indicating a predetermined relative sound volume ratio between the voice transmission input signal and the voice reception output signal; and a multiplication unit configured to calculate the voice reception output signal by multiplying a signal based on the voice reception input signal by a value based on the adaptive gain.

12. A signal processing method performed by a signal processing device configured to supply a voice reception output signal to a sound release device side, the voice reception output signal being based on a voice reception input signal received from far end by telephone apparatus having a sound release device and a sound collection device, and configured to transmit a voice transmission output signal to the far end side, the voice transmission output signal being based on a voice transmission input signal supplied from the sound collection device side, the signal processing device including an adaptive gain calculation unit and a multiplication unit, the signal processing method comprising:

calculating and outputting, by the adaptive gain calculation unit, an adaptive gain for processing the voice reception output signal, by utilizing at least the voice transmission input signal and a relative volume value, the relative volume value indicating a predetermined relative sound volume ratio between the voice transmission input signal and the voice reception output signal; and calculating, by the multiplication unit, the voice reception output signal by multiplying a signal based on the voice reception input signal by a value based on the adaptive gain.

* * * * *